Sept. 11, 1962      J. T. GOODWIN      3,053,007
WORK TABLE FOR COPYING MACHINE
Filed April 11, 1958      9 Sheets-Sheet 1
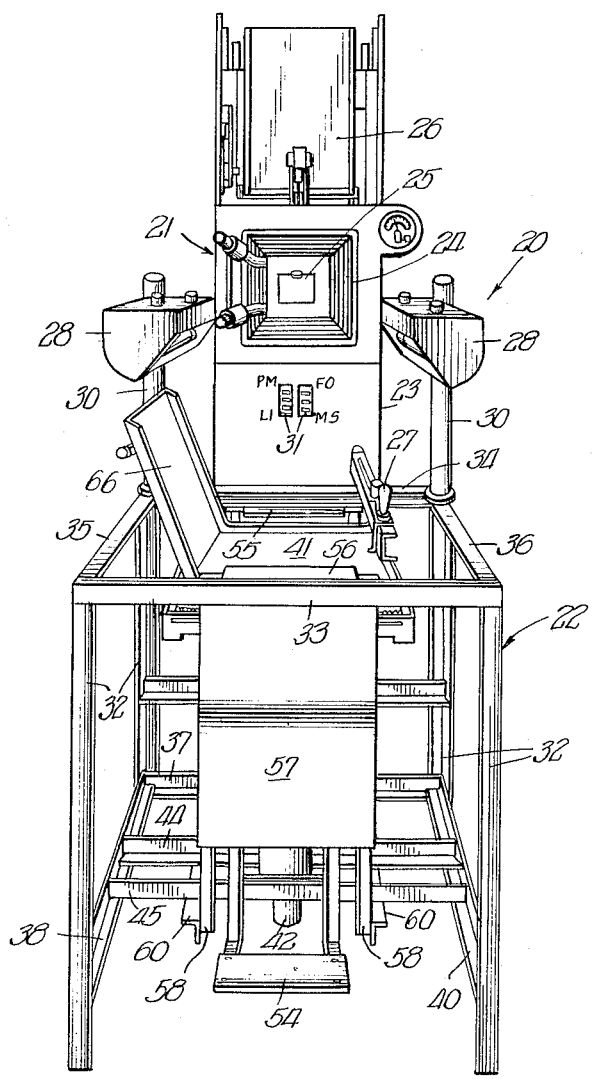
INVENTOR.
Joseph T. Goodwin,
BY
Cromwell, Greist & Warden
Attys.

Sept. 11, 1962 J. T. GOODWIN 3,053,007
WORK TABLE FOR COPYING MACHINE
Filed April 11, 1958 9 Sheets-Sheet 2
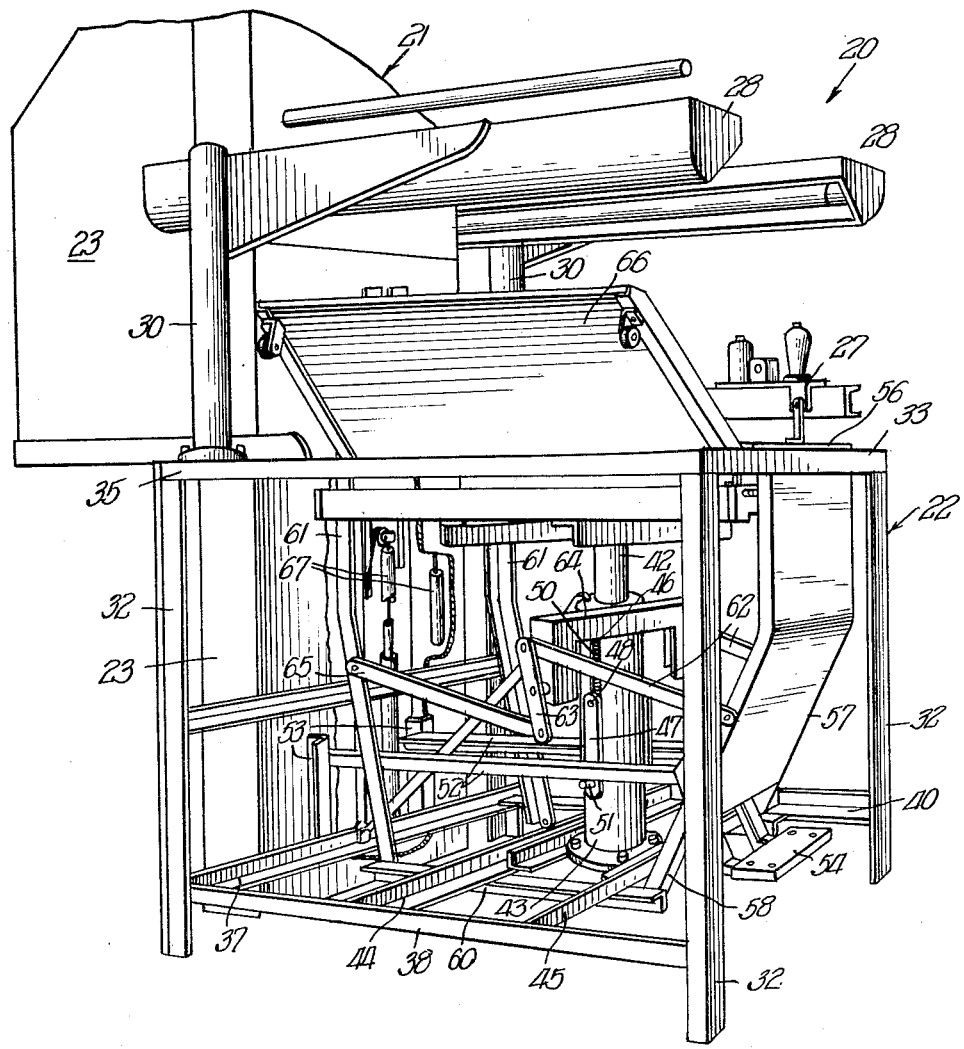
INVENTOR.
Joseph T. Goodwin,
BY
Cromwell, Greist & Warden
Attys.

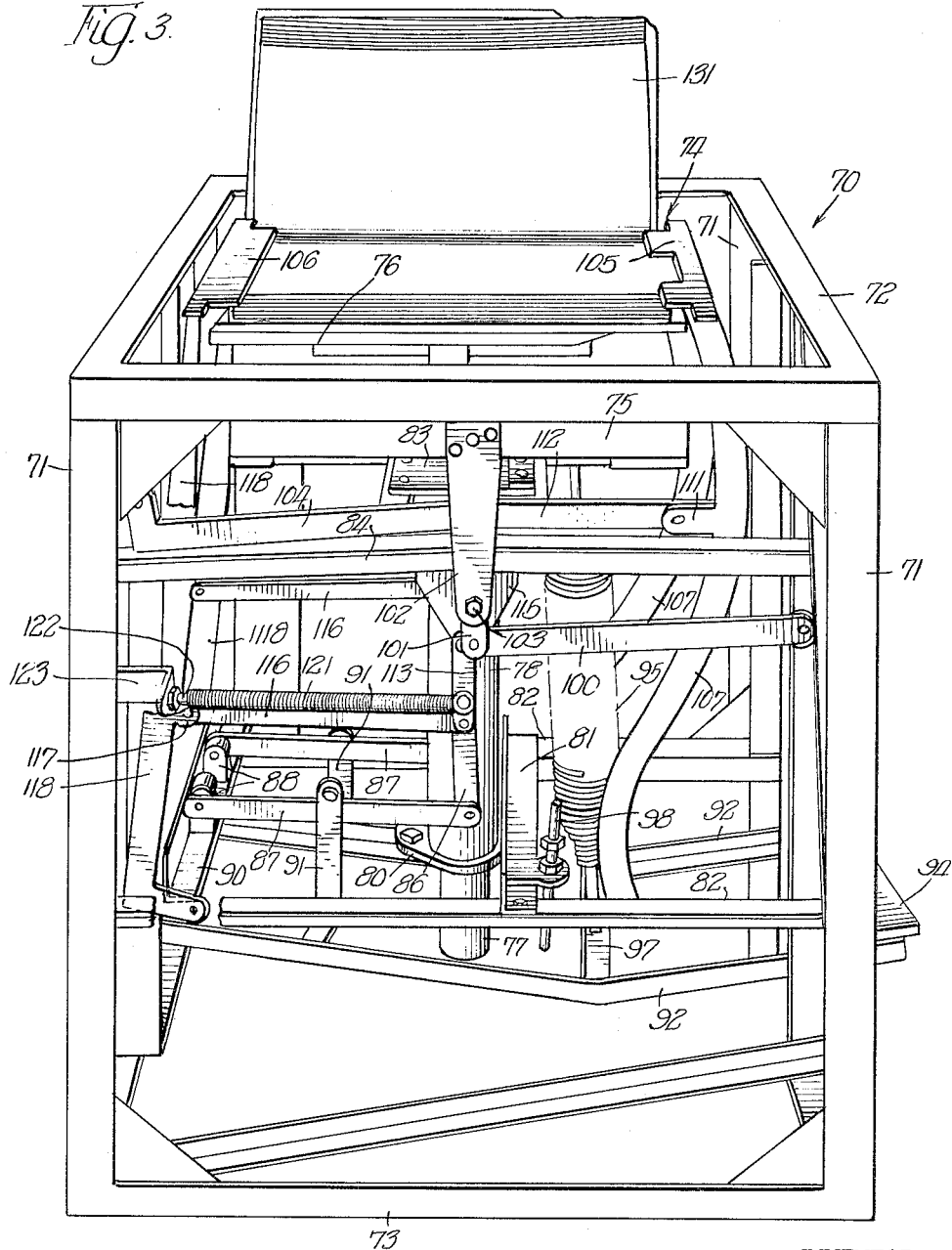

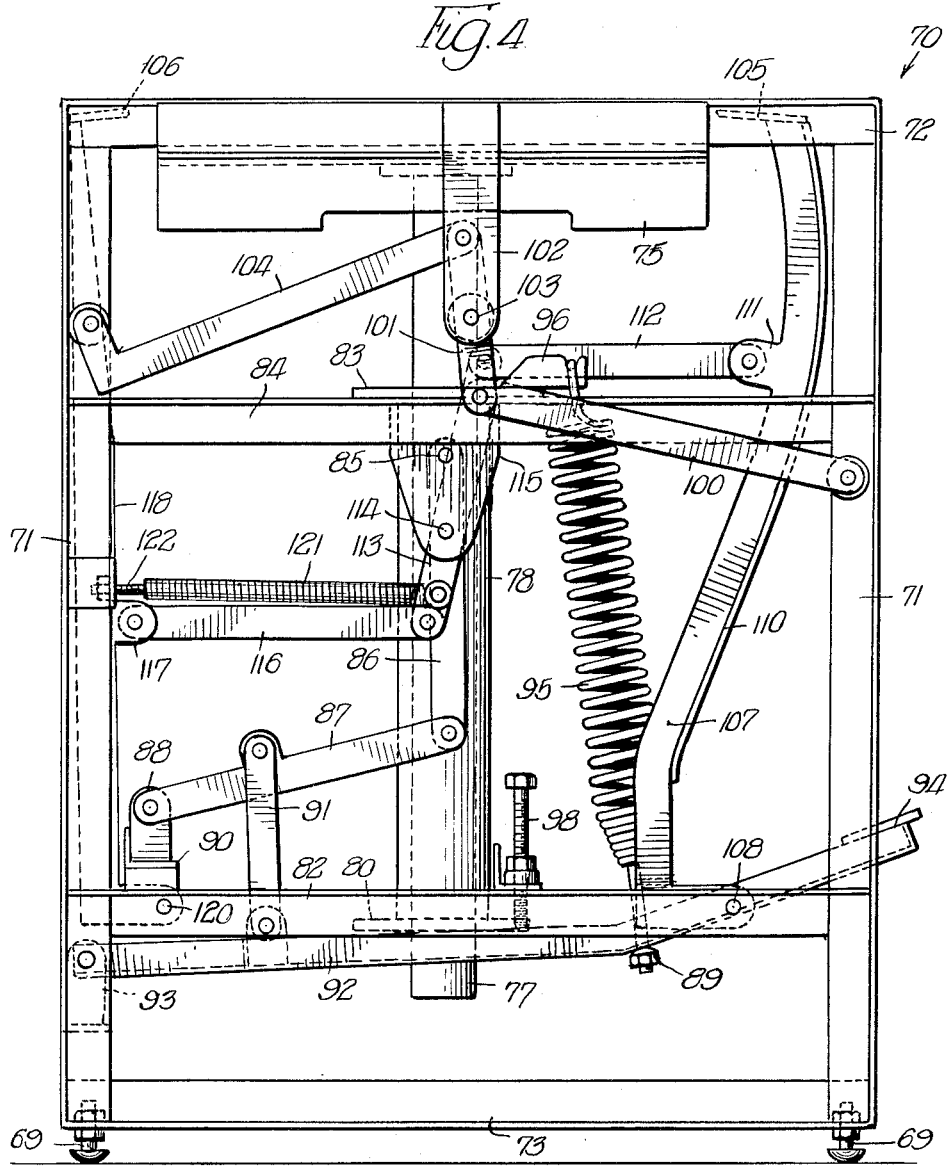

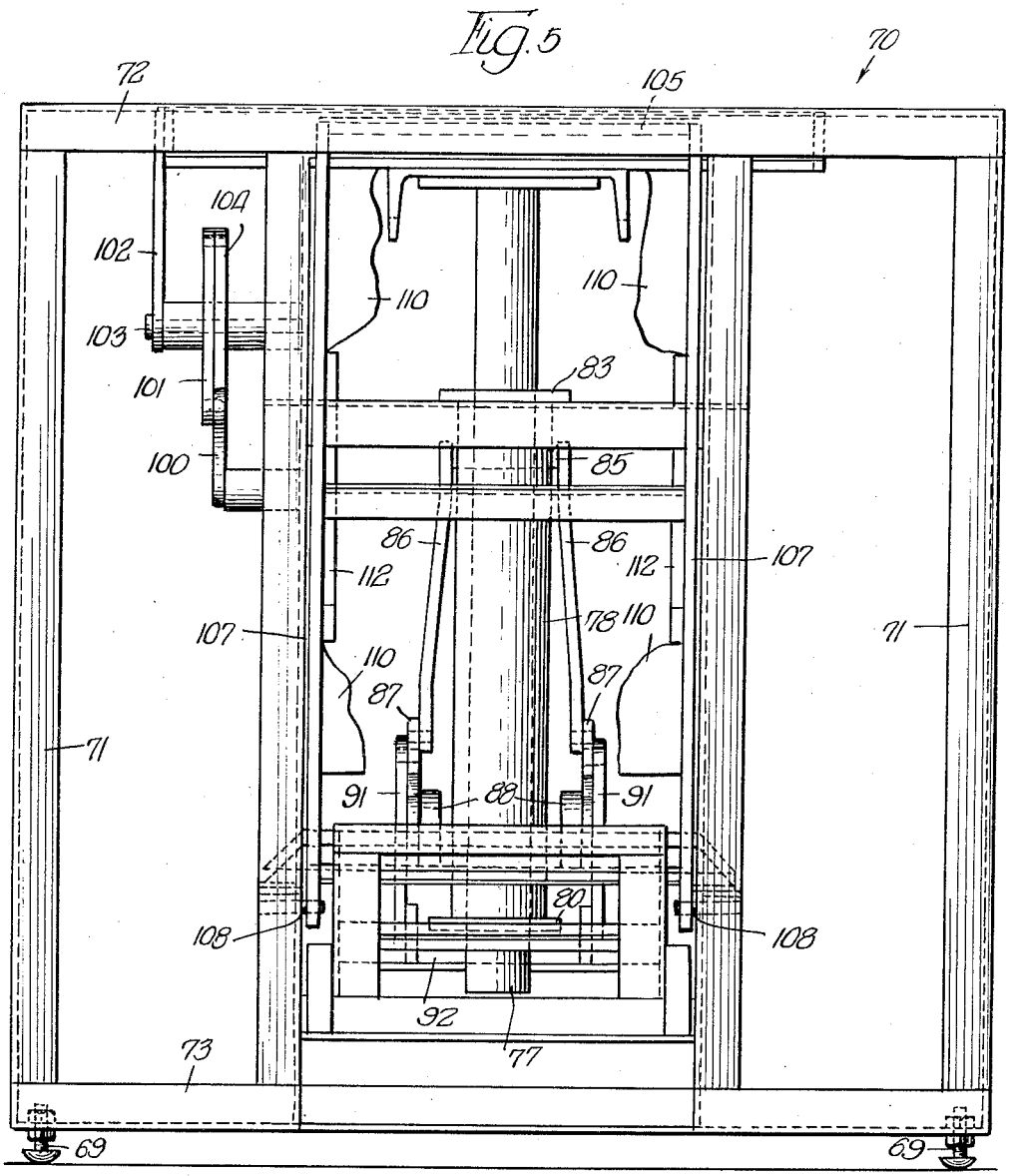

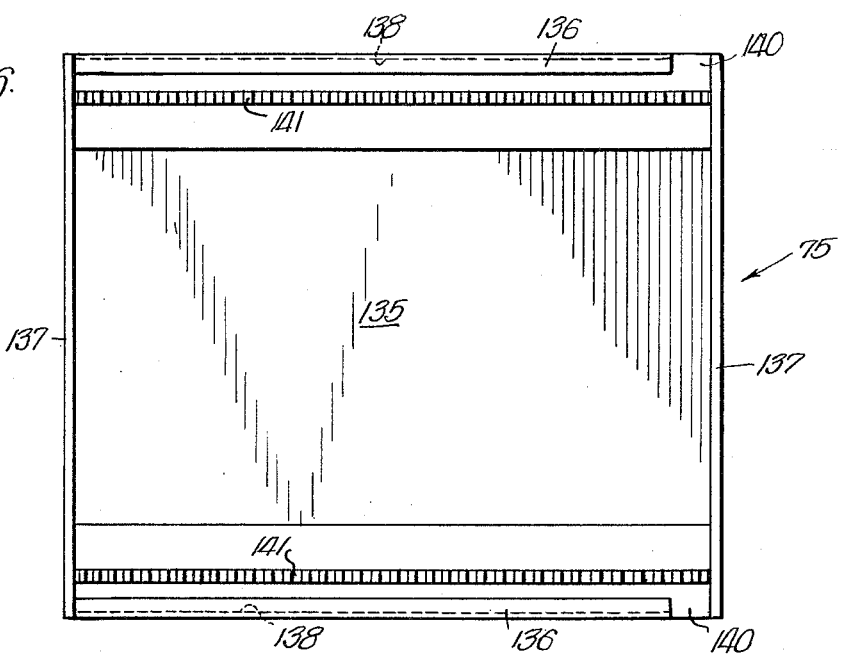
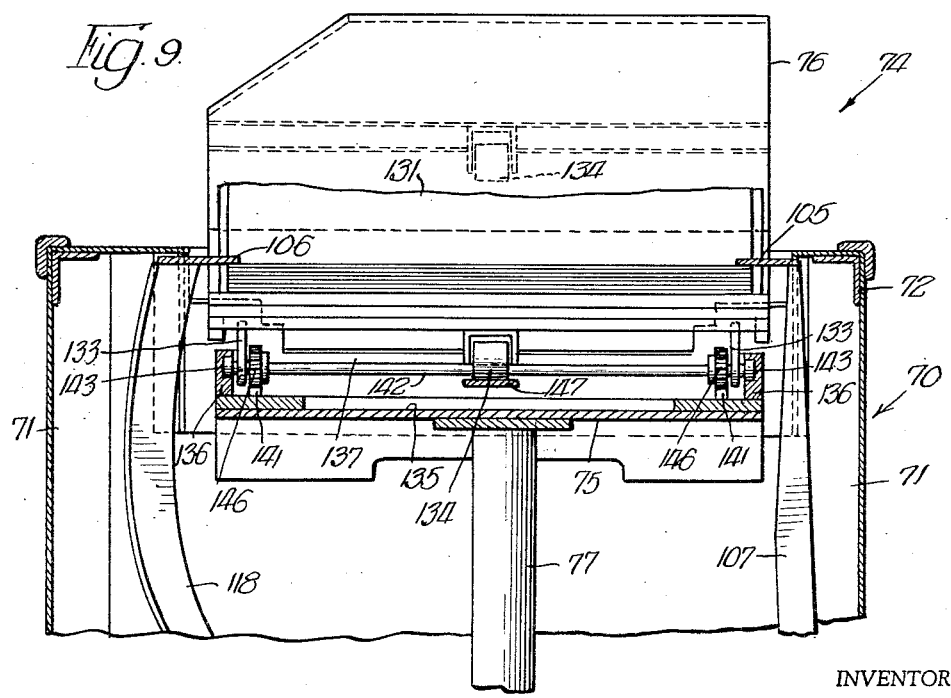

INVENTOR.
Joseph T. Goodwin,

Sept. 11, 1962 J. T. GOODWIN 3,053,007
WORK TABLE FOR COPYING MACHINE
Filed April 11, 1958 9 Sheets-Sheet 8
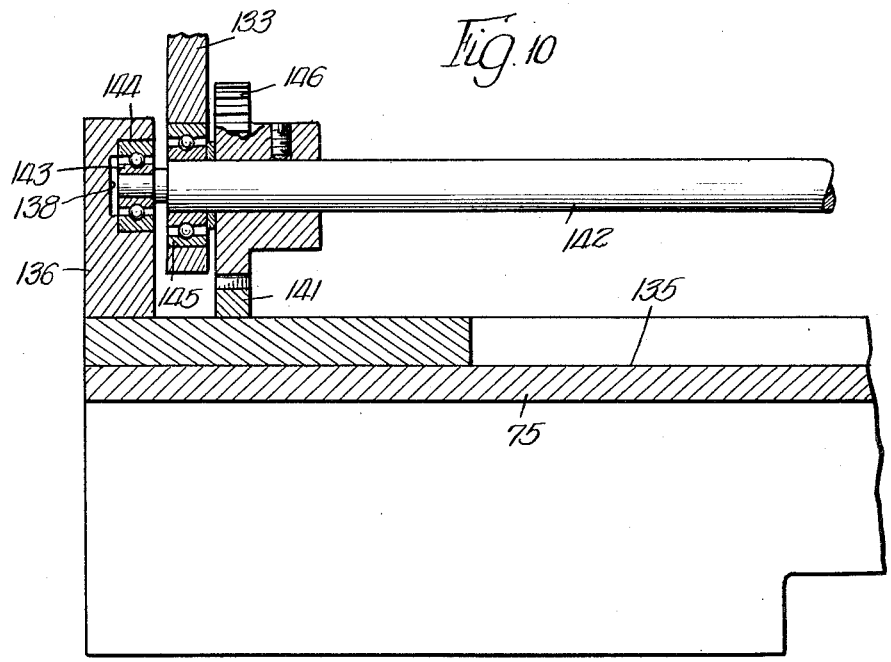
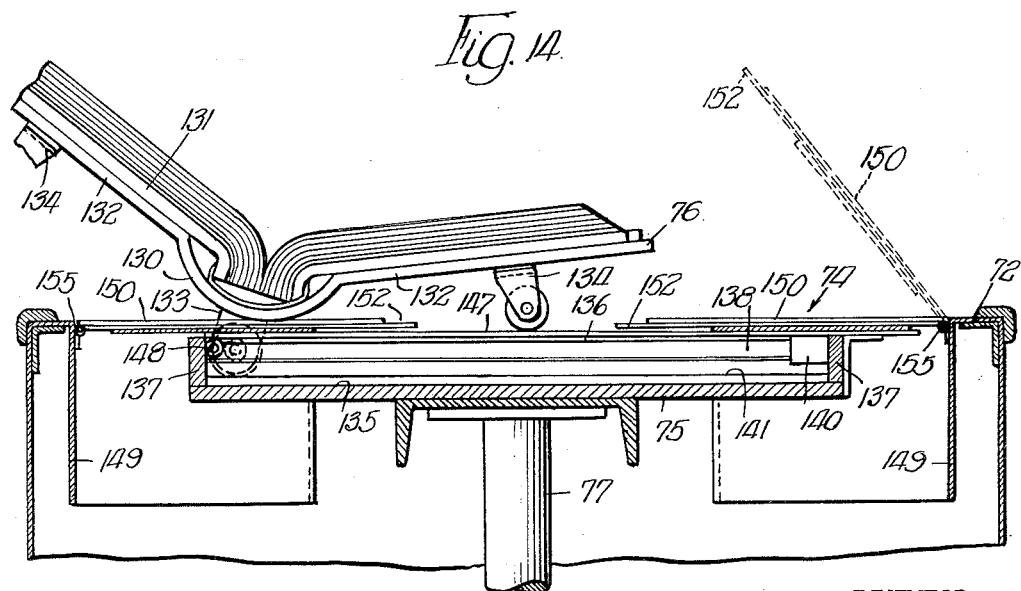
INVENTOR.
Joseph T. Goodwin,
BY
Cromwell, Greist & Warden
Attys.

Sept. 11, 1962 J. T. GOODWIN 3,053,007
WORK TABLE FOR COPYING MACHINE
Filed April 11, 1958 9 Sheets-Sheet 9
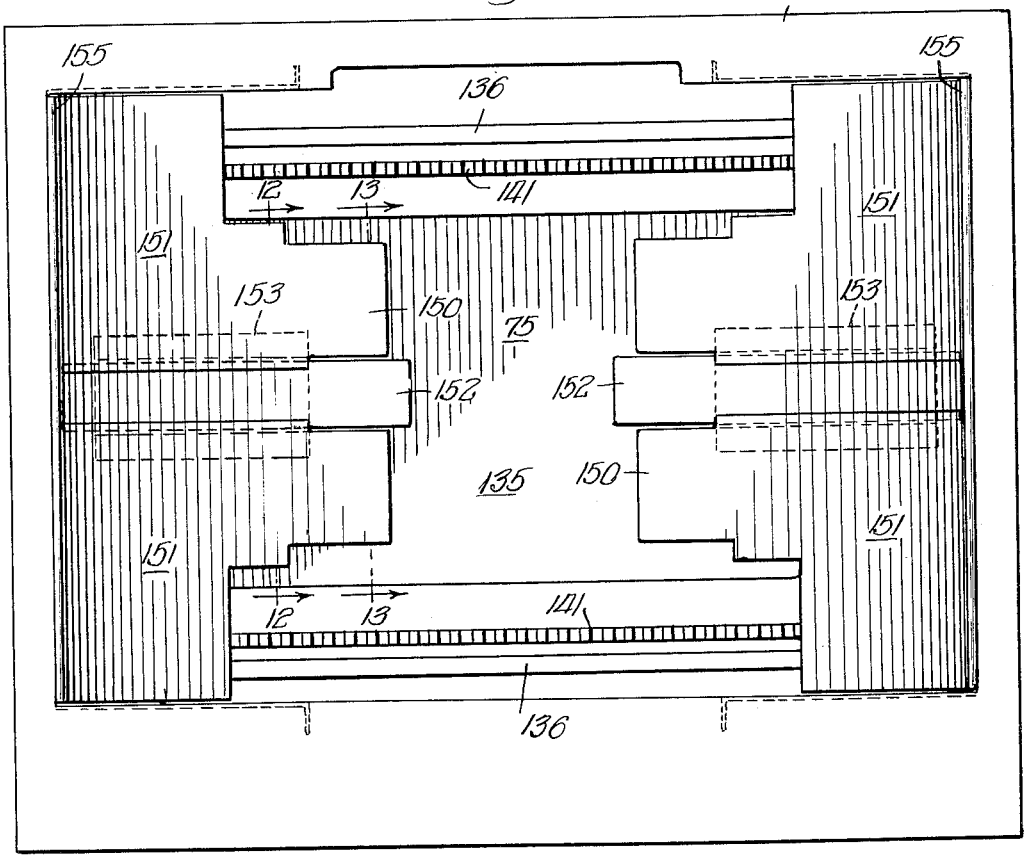
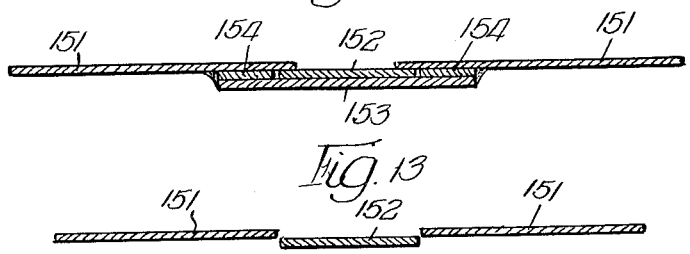
INVENTOR.
Joseph T. Goodwin,
BY
Cromwell, Greist & Warden
Attys.

3,053,007
WORK TABLE FOR COPYING MACHINE
Joseph T. Goodwin, % The Goodwin Mfg. Co.,
417 S. Fleming St., Dallas, Tex.
Filed Apr. 11, 1958, Ser. No. 727,994
23 Claims. (Cl. 45—86)

The present invention relates broadly to copying apparatus which is operative in activating an image area on a strip of sensitized material by means of radiant energy transmitted and directed from a selected portion of a stationarily positioned original. More particularly, the invention is directed to a work table forming a part of copying apparatus wherein the work table is used to mount and stationarily position an original for copying relative to a reproduction unit which may, if desired, be fixed to and supported by the work table or may merely be operatively associated with the work table.

Copying machines, such as those of the photographic reproduction type, are used in preparing copies of documents, printed matter and the like. Such machines are used to particular advantage in governmental document recording offices wherein many different types of legal documents are recorded for safekeeping and ready reference. Documents of this type are normally bound into relatively large volumes often resulting in unwieldy size books which are not readily adapted for use in known types of copying machines. Many different forms of reproduction equipment may be suitably used to copy the various pages of these large books but the greatest difficulty lies in providing a suitable means for properly mounting and holding the books in open condition for reproduction purposes.

My co-pending application, Serial No. 492,449, filed March 7, 1955, now Patent No. 2,830,492, issued April 15, 1958, discloses a new and improved type of copying machine particularly adapted for use in reproducing portions of relatively large and unwieldy bound volumes of legal or otherwise important documents. Basically, my improved copying machine includes a reproduction unit forming a part of a single structure which includes a work table capable of supporting and positioning a book in open condition relative to the reproduction unit for copying. The single operator of this machine may efficiently manipulate the cooperative elements of the work table to locate and hold a book thereon in a suitable manner for controlled reproduction of continuous or isolated portions of the book.

As disclosed in my co-pending application, the reproduction portion of the machine is capable of operating to expose only selected portions of the sensitized reproduction material forming a part thereof in order to reproduce selected portions of the book in a continuous material and in time saving manner. This feature does not form a part of the present invention as the same is directed solely to new and improved structural features of the work table which cooperates with reproduction apparatus of the type described for copying purposes. In this respect, this application is directed to a suitable form of work table for use with the reproduction unit of my co-pending application and constitutes a continuation-in-part thereof.

Known types of copying machines include means adjustable by the operator for supporting a document to be reproduced and holding the same in the focal plane of the energy focusing portion of the reproduction unit. Many of these machines utilize a movable document supporting plate which cooperates with a fixed glass plate located in the focal plane of the lens system of a camera with the movable plate clamping the document to be reproduced between the same and the inner surface of the glass plate. While this type of arrangement may be suitable in the reproduction of flat, unbound documents, difficulties have been encountered in connection with the reproduction of bound documents requiring the handling of an open book with the bound edges of the documents being difficult to place within the focal plane of the camera for accurate reproduction thereof. The opening of a book, particularly a fairly large volume, results in a central humping of the pages in association with the bound margins thereof presenting a non-flat surface for copying. Known equipment of the type described operates to flatten these pages to an extent but in each instance the entire book is forced against the inner surface of the glass plate in open condition and inner marginal portions of the top pages are not always brought into proper coinciding relation with the focal plane of the camera. Such equipment is entirely incapable of adequately flattening an opened book of any substantial size such as is normally encountered in governmental recording offices. It has also been found that the glass plate used is reflective to an extent that it interferes with faithful reproduction.

It is an object of the present invention to provide a new and improved work table for use with copying machines either as a part thereof or as a separate unit, the work table incorporating adjustable and readily controlled open book positioning means whereby the opened portions of the book to be reproduced are readily and effectively positioned and maintained in the focal plane and centered relative to the focal axis of a reproduction unit.

A further object is to provide a new and improved work table for copying machines of the type described wherein the table includes a vertically reciprocable surface by which an original to be copied is supported and moved vertically into and out of the focal plane of a fixed reproduction unit, the surface further being transversely adjustable relative to the focal axis of the energy focusing means of the reproduction unit to alternately place opposite page portions of a book-type original in the focal plane in centered relation to the focal axis for reproduction thereof and without the use of an intermediate media through which reproduction is accomplished, the surface having means operatively associated therewith for use in vertically positioning and alternately transversely moving portions of the original into accurate reproduction position without undue or excessive manipulation thereof and to fixedly clamp the original relative to the surface at points which are out of association with the portion of the original to be reproduced.

Still another object of the present invention is to provide a new and improved book holding and manipulating device for use with a copying machine and constituting a portion of a work table therefor, the device being capable of positioning pages of an open book in the focal plane and centered relative to the focal axis of a reproduction unit for virtually undistorted reproduction thereof, the device being easily and readily manipulated to position consecutive pages and alternately place opposite pages of an open book in centered relation to the focal axis and within the focal plane regardless of the size and weight of the book and without undue manipulation of the book.

Other objects not specifically set forth will become apparent from the following detailed description made in conjunction with the drawings wherein:

FIG. 1 is a front view in perspective of a copying machine utilizing one form of work table of the present invention;

FIG. 2 is a fragmentary side view in perspective illustrating the operating lever and linkage system of the copying machine of FIG. 1;

FIG. 3 is a side view in perspective of a preferred form of work table for use in the copying machine of FIGS. 1 and 2;

FIG. 4 is a partially diagrammatic side view of the work table of FIG. 3;

FIG. 5 is an internal front view of the work table illustrating in detail the preferred operating lever and linkage system;

FIG. 6 is an enlarged detailed top view of a platform element constituting a part of the work table;

FIG. 9 is a transverse section of the top portion of the work table taken generally along line 9—9 of FIG. 8;

FIG. 10 is an enlarged fragmentary and partly sectioned view of certain of the details of the movable table system of the work table;

FIG. 11 is a detailed top plan view of the top portion of the work table illustrating foldable cover flaps included therein;

FIG. 12 is an enlarged fragmentary section of one of the flaps of FIG. 11 taken generally along line 12—12 therein;

FIG. 13 is an enlarged fragmentary section of another portion of one of the flaps of FIG. 11 taken along line 13—13 therein; and FIG. 14 is a view similar to FIG. 8 illustrating certain operative functioning of the top portion of the work table.

Figure 7:
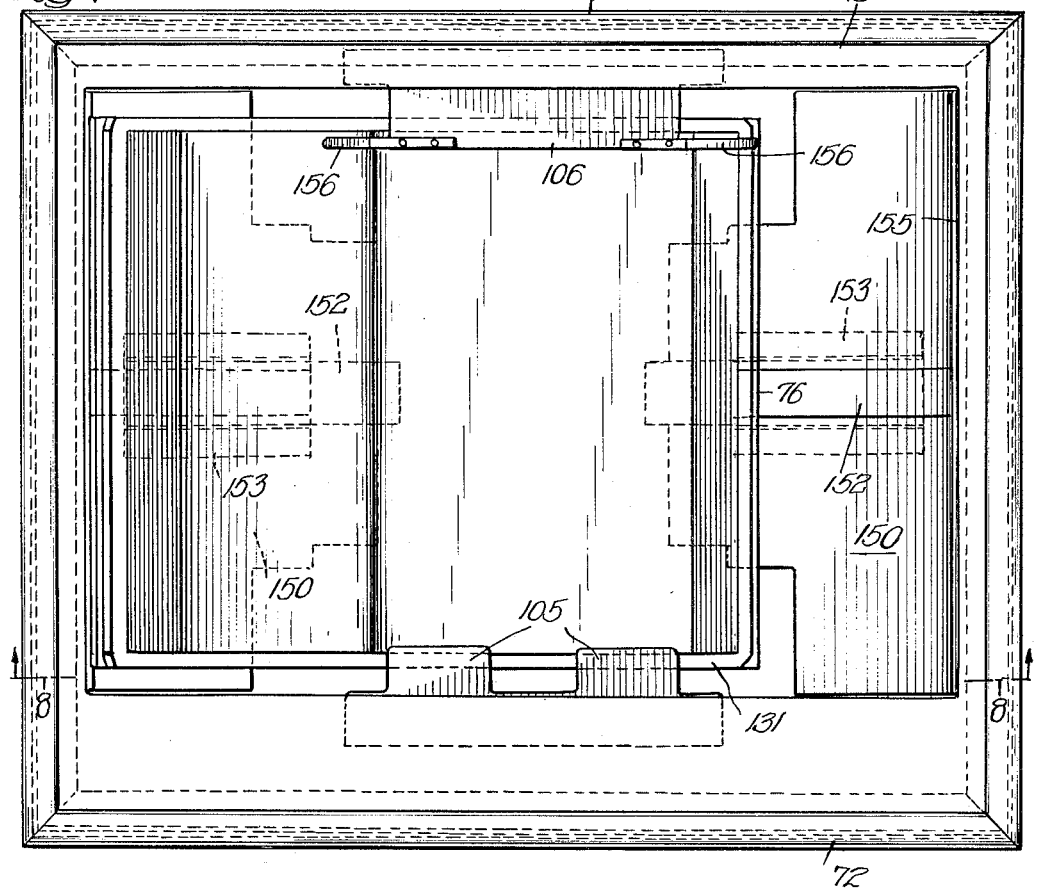
FIG. 7 is a top plan view of the work table illustrating operative holding of a book thereon.

FIG. 1 illustrates a complete copying machine structure 20 which includes as the main components thereof a reproduction apparatus 21 mounted on a work table structure 22. The reproduction apparatus 21 may be of any suitable type preferably that which is illustrated and fully described in my aforementioned co-pending application. As the present application is directed solely to the work table structure, it is unnecessary to describe in detail the reproduction apparatus other than as follows.

A cabinet or housing 23 is mounted on and extends rearwardly of the back surface of the work table 22 and includes therein a camera 24 provided with a prism 25 or other optical means whereby the image of horizontally disposed matter supported by the work table is projected properly on vertically disposed photo-sensitive paper carried within the cabinet 23 and forming a part of the camera 24. A movable mask assembly 26 extends upwardly from within the cabinet 23 and operates to control exposure of predetermined portions of the film strip associated with the camera 24 in response to operation of a slide or indexing carriage 27 extending outwardly from the lower front face of the cabinet 23. As fully described in my co-pending application, the indexing carriage 27 is associated with a page of a book or other document to be photographed by the camera 24 and manipulation of the indexing carriage 27 pin-points the portion of the page which is reproduced by the camera to the exclusion of adjacent portions of the page. The matter to be copied is illuminated by suitable light sources 28 extending outwardly from the front face of the cabinet 23 relative to each side of the document supported by the work table 22. The lighting units 28 are suitably supported by posts 30 attached to the work table 22 as illustrated. Suitable camera controls 31 are mounted on the front face of the cabinet 23.

The work table 22 of FIGS. 1 and 2 includes a rectangular frame formed from four vertical corner posts 32 connected at their upper ends by front and back angle members 33 and 34 and side angle members 35 and 36. The corner posts are connected adjacent their lower ends by a lower back angle member 37 and lower side angle members 38 and 40. A book holding and manipulating device 41 for supporting a book or other matter to be copied is mounted on a plunger 42 slidably extending through a vertical cylindrical member 43 mounted on cross members 44 and 45 which extend between the lower side members 38 and 40 of the frame.

The plunger 42, and therefore the book holding device 41, is biased upwardly by a compression spring 46 (FIG. 2) disposed in the cylindrical member 43. The plunger 42 is movable downwardly against the force of the spring 46 by means of a pair of links 47 which are secured at their upper ends to a pin 48 connected to the plunger and whose opposite ends extend outwardly of the cylindrical member through vertical slots 50 in opposite sides thereof. The lower ends of the links 47 are provided with outwardly extending pins 51 on which rest levers 52 whose rear ends are pivotally connected to vertical risers 53 mounted on the lower rear member 37 of the frame. A treadle 54 is mounted on the front ends of the levers 52 so that the operator of the apparatus normally standing before the frame can move the platform down against the resistance of the spring 46 by pushing downwardly on the treadle with his foot.

The matter to be copied, such as a book, is held firmly on the book holding and manipulating device by lips or page holders 55 and 56 which extend inwardly over the back and front edges, respectively, of the platform 41 and which are movable inwardly toward each other by means of the knee plate 57 on which the front lip 56 is mounted. The knee plate in turn is mounted on two levers 58 whose lower ends are pivotably secured to two angle members 60 which are rigidly fastened to the cross members 44 and 45. The back plate or holder 55 is mounted on the top ends of levers 61 whose lower ends are pivotally secured to the rear ends of the angle members 60. The front and back holders are connected by a mechanical linkage which includes links 62 whose forward ends are pivotally secured to the knee plate at the side thereof and intermediate the upper and lower ends thereof. The rear ends of the links 62 are secured to the ends of central links 63 pivotally mounted at their centers to an inverted U-bracket 64 secured to the cylindrical member 43. To the opposite ends of the central links 63 are pivotally secured the forward ends of links 65 whose rear ends are pivotally secured to the levers 61. It will be apparent that the weight of the lips and of the knee plate tends to move them outwardly and that movement of the knee of the operator moving the knee plate 57 inwardly will cause simultaneous movement of the back and front lips toward each other since the mechanical linkage will cause simultaneous equal movement of the two lips.

It will be apparent that when it is desired to photograph a page of a book, the operator depresses the treadle 54 with his foot lowering the book holding and manipulating device 41. The book is then placed on the horizontal portion of the device 41 and opened to the desired page, the inclined portion 66 supporting the left cover of the book together with such pages as are moved to the left as the book is opened. The operator then move his knee inwardly causing the front and back lips 56 and 55, respectively, to move inwardly over the front bottom and back top edges of the page to be photographed and the treadle is then released to permit the device 41 to rise until the edges of the page of the book on the device engage the lips. The force of the spring 46 then holds the page against the lips preventing any further movement of the page or of the lips. Thus, the matter to be copied is held immovable during photographing operation.

The book holding and manipulating device 41 includes certain important structural features which will be described in detail in connection with the following description of the preferred embodiment of the present invention. As illustrated in FIG. 2, the bottom portion of the cabinet 23 includes therein a system of counterweights 67 which function in operative relation with the movable masks 26 forming a part of the camera structure. This portion of the reproduction apparatus is located rearwardly of the work table 22.

While the work table 22 has been described in connection with its operative use with a camera structure, it will be understood that this table and the preferred embodiment of the same to be described is adapted for use with any suitable type of reproduction unit which is operative in activating an image area of sensitized material by means of radiant energy transmitted and directed from a selected portion of a stationarily positioned original.

The preferred embodiment of work table is shown in FIGS. 3–5 with respect to its overall structural arrangement and general operative features. The work table 70 generally conforms to the structural arrangement and incorporates the operative principles of the work table 22 previously described. This table is of generally rectangular shape including a rectangular frame structure having four corner posts 71 supporting at the top a frame 72 and attached at the bottom to a frame 73. As shown in FIGS. 4 and 5, the bottom frame 73 carries adjustable supports 69 of known type used in levelling the work table for operational use. The frame structure includes a number of braces and gussets to reinforce the same and keep it as rigid as possible and free from distortion. In addition, there are numerous transverse and vertical angle bar members which support the various fulcrum points to be described.

Supported somewhat centrally in the frame structure is a movable book holding and manipulating device generally identified by the numeral 74. This device will be described subsequently in greater detail but for general purposes of understanding the operation of the work table 70, the device 74 includes a vertically movable platform or base 75 carrying thereon an adjustable book support 76. The table structure 74 is supported upon a rod or shaft 77 carried within a fixed housing 78 which is in the form of a sleeve fixed at the bottom through a transverse rod guide 80 to a horizontal frame member 81 supported at its ends on horizontal side bars 82 forming a part of the general frame structure. The top of the sleeve 78 similarly carries a rod guide 83 suitably attached to side frame supports 84.

Opposite side portions of the sleeve housing 78 carrying the vertically movable rod 77 therein are provided with vertical slot-like openings (not shown) which expose the rod 77 for lever attachment in a manner to be described. Referring particularly to FIG. 4, the rod 77 is provided with a connecting pin 85 extending transversely therethrough and projecting through the oppositely positioned vertical slots in the sleeve 78 and outwardly therefrom into attachment with a pair of links 86. The links at the uppermost ends thereof are each pivotally attached to an outer end portion of the pin 85 and extend downwardly therefrom into pivotal attachment with substantially horizontally directed bell cranks 87. The outermost ends of each of the bell cranks 87 are pivotally attached to an ear 88 fixedly carried by a horizontal back frame member 90. Substantially centrally of each bell crank 87 a vertically directed link 91 is pivotally attached thereto at the uppermost end thereof and extends downwardly into pivotal attachment with a suitable attaching ear forming a part of the frame of a treadle structure. The treadle structure includes a pair of spaced and braced angle iron levers 92 which extend through the front of the frame structure of the table 70 into pivotal attachment with fixed ears 93 at the rear of the frame structure. The forward end of the treadle structure carries a treadle plate 94 on which the operator places a foot to control movement of the platform and book support in a vertical direction.

A coil spring 95 extends from a fixed anchor 96 forming a part of the table structure 70 in a downward direction into adjustable attachment with a bracing member 97 of the treadle structure extending between the angle irons 92. The spring 95 is adjustably tensioned by an adjustment screw 89 (FIG. 4) to urge the treadle 94 in an upward direction about the pivot points defined by the fixed ears 93 resulting in counter-clockwise movement of the bell cranks 87 about the fixed pivot points 88 and upward movement of the links 86 accompanied by upward movement of the platform 75 supported by the rod 77 as transmitted through the transverse pin 85. With the spring 95 being tensioned during mounting of the same, the table system is constantly urged upwardly thereby and downward pressure on the treadle 94 is necessary to move the platform 75 downwardly through the series of linkages described. To limit the total extent of upward movement of the platform in response to the action of the spring 95, a fixed platform height adjustment screw 98 is suitably supported by the transverse frame member 81 and is directed downwardly for engagement with a part of the treadle structure. Suitable adjustment of the screw 98 will control the extent to which the platform will rise relative to the top frame 72 of the work table 70.

During upward and downward movement of the platform 75 it is desirable to prevent rotation of the entire device 74 about its axis of vertical movement. To prevent rotation, a parallel linkage system is included and comprises a link 100 pivotally attached to a front vertical frame member and further pivotally attached at its innermost end to a lever 101 which is centrally pivotally attached to a depending flange 102 by a pin 103. The flange 102 fixedly depends from the frame structure and the uppermost end of the lever 101 and is pivotally attached to a link 104 which extends toward the rear of the frame 70 into pivotal attachment with a rearmost vertical frame member. The parallel linkage system described provides for uniform vertical movement of the book holding and manipulating device 74 without the presence of a rotational component of movement. Resetting or repositioning of the book support 76 for each page change is uniform and each copy made will be aligned with previous copies on the continuous strip of sensitized material in the reproduction unit.

Book and page holders in the form of lips 105 (front) and 106 (rear) form an important part of the work table 70 to function in the same manner as those utilized in the work table 22 previously described. The lip 105 is mounted on a pair of spaced downwardly directed supports 107 which are pivotally mounted at the lowermost ends thereof through pins 108 to the side frame members 82. The support members 107 carry therebetween a knee plate 110 for knee operation by the operator for moving the lips 105 and 106 into operative engagement with a book. Toward the upper ends of the support members 107 the same are provided with rearwardly directed ears 111 which are pivotally attached to links 112. The innermost ends of the links 112 are pivotally attached to vertically directed levers 113 which are in the form of bell cranks and are pivotally connected through pins 114 each to one of a pair of depending flanges 115 suitably carried by the frame members 84. The lowermost ends of the levers 113 are pivotally attached to horizontally extending links 116 which in turn are pivotally attached to ears 117 carried by vertically directed and horizontally spaced supporting members 118 having attached at the tops thereof the rear lip 106. The support members 118 are pivotally attached through pins 120 to the horizontal side frame members 82.

Knee pressure of the operator on the knee plate 110 results in counter-clockwise movement of the support members 107 about their attaching pins 108 and inward movement of the front lip 105. With this movement the links 112 move inwardly and the levers 113 are pivoted about their pins 114 in a counter-clockwise direction. The links 116 move inwardly as a result of bell crank pivoting and the rear lip support members 118 move in a clockwise direction about their pivot points 120. A coil spring 121 is fixedly attached at its innermost end to one of the levers 113 at a point in close association with the pivotal attachment of the lever 113 with the link 116. The rearmost end of the coil spring 121 is attached by an adjustment screw 122 to a bracket 123 suitably mounted on the frame structure. The coil spring 121 is tensioned to urge at all time the lips 105 and 106 out of association with the movable book holding and manipulating device 74 and operation of the coil spring 121 causes the lips to move into inoperative positions upon the releasing of knee pressure against the knee plate 110. The linkage and leverage system described in connection with the operation of the lips 105 and 106 is so proportioned that the lips move equal distances toward and away from one another. The effective width of each lip with respect to its overlapping a margin of a page may vary with the marginal characteristics of the pages of a book supported by the table.

The foregoing description illustrates the basic operational features of the work table 70 along the lines of operation previously described in connection with the work table 22. Utilization of the work table 70 is accomplished by the mounting of an open book upon the supporting surface of the support 76, application of pressure on the treadle 94 to lower the platform 75 and book below the lips 105 and 106, application of pressure against the knee plate 110 to move the lips 105 and 106 toward one another to place the same in position for engagement with the open surface of the book when the latter is raised by the platform 75 into contact therewith, and releasing of pressure against the treadle 94 to allow the table system to rise. Thus, operative positioning of the lips 105 and 106 results in engaging an open page of the book carried by the device 74, holding and flattening the same for copying while simultaneously preventing further raising of the device 74 while holding the same in proper focal plane relation for efficient reproduction upon operation of the copying apparatus associated with the table.

With the exception of the platform rotation preventing linkage arrangement, all other link and lever systems for controlling vertical movement of the book holding and manipulating device and operative positioning of the page holding lips are duplicated in the work table on each side of the central axis thereof as defined by the movable rod 77. Duplication of these structures provides for a balancing of the forces of operation and prevents tilting of any of the movable elements of the structure due to unbalanced loading of the book holding and manipulating device. Preferably, the force supplied by the spring 121 in the operation of the lips 105 and 106 is just enough to cause the lips to immediately move into their inoperative positions away from the book upon slight lowering of the platform and a slight reduction in the force of engagement between the open page of the book and the lips. In other words, the spring and linkage operation of the page holding lip arrangement should be balanced so that very little pressure is required to move the lips into their operative position and permit the same to be readily held therein through frictional engagement with the open page of the book. It will be noted that the work table 70 includes the spring 95 mounted separate from the sleeve 78 although it will be understood that this spring may be mounted about the rod 77 within the sleeve 78 to function in the same manner as described in connection with the spring 46 of the work table 22.

The lips 105 and 106 actually lie within or sufficiently adjacent to the focal plane of the reproduction unit to uniformly locate the open pages of a book in this focal plane for reproduction purposes. Efficient page positioning will always occur regardless of the particular portion to which the book is opened. The number of pages beneath the open page will be of no consequence as the platform 75 will continue to rise until contact is made between the lips and the open page.

An important aspect of the present invention resides in the structural features of the vertically movable book holding and manipulating device 74 including therein the platform 75 mounted on the top end of the rod 77 and the book support 76 carried by the platform and movable relative therein in a manner to be described. As shown adequately in FIGS. 8 and 9, the general arrangement of the top portion of the work table 70 includes the top frame 72 through the center of which the device 74 is vertically movable. The page holding lips 105 and 106 are located on opposite sides of the table system 74 (front and rear edges thereof) and are movable toward one another into position to limit further upward movement of the table system as previously described.

Figure 8:
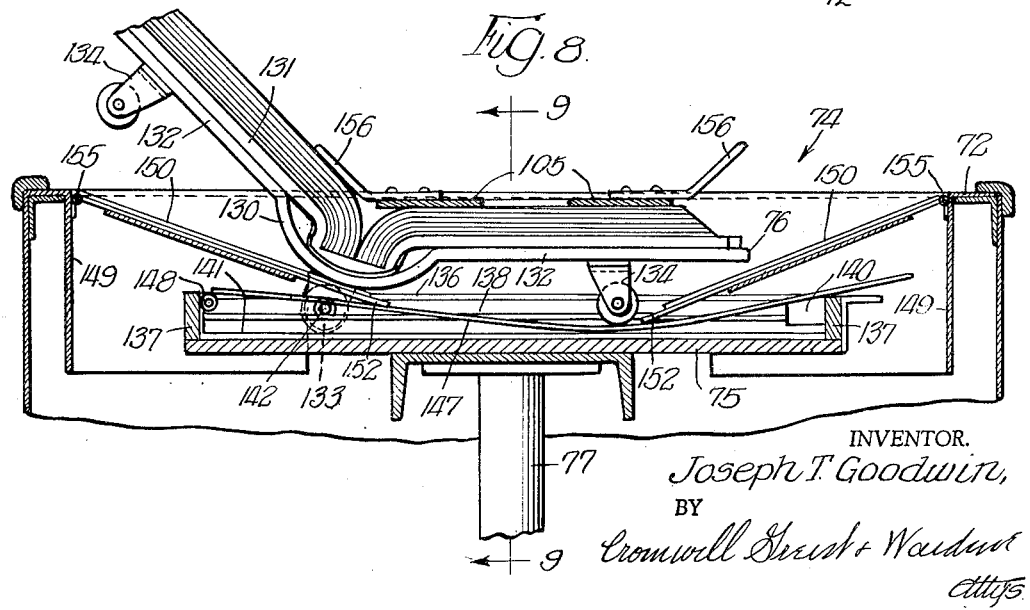
FIG. 8 is a fragmentary section of the top portion of the work table taken generally along line 8—8 of FIG. 7.

As particularly shown in FIG. 8, the book support 76 may be described as a "butterfly" being provided with a central arcuate portion 130 presenting an upper surface which is concave and which is of sufficient depth to be capable of receiving the central binding of a book 131. The side margins of the concave portion 130 have integrally joined therewith outwardly and upwardly directed wing portions 132 which define supporting surfaces for the covers and pages of the book 131. The central arcuate portion 130 is provided with a pair of spaced depending ears 133 which, as particularly shown in FIG. 9, are located near the outer ends of the central portions and are utilized to mount the book support 76 to the platform 75 in a manner to be described. Each of the wing portions 132 is provided with a known type of roller or caster assembly 134 for use in a manner to be described.

The platform 75, as particularly shown in FIGS. 6 and 8–10, is a rectangular box provided with a flat bottom 135, upstanding front and rear walls 136 of identical construction and upstanding side walls 137 also of identical construction. The front and rear walls 136 constitute book support bearing tracks each being provided with an inwardly opening groove 138 intermediate the top and bottom margin thereof which constitutes a bearing track. The walls 136 are interrupted at opposite ends thereof to define openings or notches 140 for a purpose to be described. Inwardly of each of the walls 136 is a continuous rack 141 carrying a series of spaced gear teeth along the top thereof.

Extending across the platform 75 as particularly shown in FIGS. 8–10 is a book support shaft 142 which carries on opposite ends thereof a standard type of bearing unit including a sleeve 143 which as shown in FIG. 10 houses a series of roller bearings between the same and a support track bearing 144 received in the track 138 of each of the walls 136. The shaft 142 receives thereon the attaching ears 133 with the ears and shaft carrying therebetween a suitable roller bearing unit 145. Inwardly of each of the attached ears 133 the shaft 142 carries a fixed gear 146 which engages a rack 141 to control the movement of the shaft 142 along the platform 75. This arrangement provides for free, substantially frictionless manual movement of the book support 76 transversely of the platform 75. A pushing of the book support in one direction causes rotation of the shaft 142 relative to the attaching ears 133 and free movement of the same along the bearing tracks 138. The gears 146 near each end of the shaft 142 assure uniform movement of the shaft 142 to maintain the same and the book support 76 at right angles to the front and rear walls 136 of the platform 75. Upon adequate movement of the book support 76 toward the right side wall 137 as viewed in FIGS. 8 and 14, the bearings 143 at the ends of the shaft 142 will move into the notches 140 in the walls 136 and thus become free of the bearing tracks 138. With this arrangement the book support 76 may be freely removed with the shaft 142 attached thereto from association with the platform 75 for maintenance purposes. This feature also permits ready assembling of the cooperating elements of the book holding and manipulating device.

The gear and rack system described provides for ready transverse movement of the book support 76 across the platform 75 while maintaining the support in squared relation on the platform. The book 131 when placed on the support 76 and gripped by the lips 105 and 106 is at least roughly squared up thereon by engagement with the lip support members 107 and 118. Final squaring of the book 131 can readily be accomplished by manipulation of the book by the operator to an extent that the lips 105 and 106 overlap equal marginal areas. As the lips are located symmetrically about the focal or optical axis of the reproduction unit, proper squaring of the book results in symmetrical positioning of the same for uniform copying.

As particularly shown in FIGS. 8 and 9, the platform 75 is provided with a resilient roller track 147 which is attached by a hinge 148 at one end thereof to a side wall 137 to permit upward pivoting of the same during transverse movement of the book support 76 and during dismounting of the same relative to the platform 75. It will be particularly noted in FIG. 8 that the roller track 147 is threaded above the shaft 142 between the same and the central portion 130 of the book support 76. The free pivoting of the track 147 by reason of its hinge connection 148 permits the same to ride on the top of the shaft 142 during transverse movement of the book support 76 without hindering the ease of movement of the book support. The track 147 is provided with a free end which may be readily threaded between the shaft 142 and the book support 76 during mounting of the same. The track 147 provides a flexible downwardly bowing surface on which the rollers 134 ride during transverse movement and flipping of the book support 76 in a manner to be described.

To complete the overall assembly, the top frame 72 of the work table 70 is provided with depending plate portions 149 adjacent the side walls 137 of the platform 75. These plates define a well in which the book holding and manipulating device 74 moves. The upper edges of the skirts 149 have hingedly attached thereto table flap structures 150 each of which are of identical design and which are oppositely positioned relative to each side of the platform 75. As particularly shown in FIGS. 11–13, each of the table flaps 150 includes centrally spaced plates 151 receiving therebetween a resilient metallic track element 152 which is supported by a connecting plate 153 suitably attached to the undersurface margins of the plates 151 through spacers 154. The connecting plate 153 is spaced inwardly from the inner ends of the flaps 150 as shown in FIGS. 11 and 12 and holds the track 152 in depressed relation relative to the main plates 151. The innermost end of the track 152 is free of the plates 151 as shown in FIG. 13 for resilient bending upon contact with the roller track 147 carried centrally and transversely of the platform 75 (FIG. 8). Each flap 150 is attached by a continuous hinge member 155 to the top frame 72 of the work table.

The flaps 150 function to close off the top opening of the work table 70 while further providing lifting tracks defined by the resilient plates 152 along which the rollers 134 move to automatically tilt the book support 76 during transverse movement of the same across the platform 75. The flaps 150 are hingedly mounted for raising upwardly into the position shown in broken lines at the right of FIG. 14 for dismounting of a book support 76 relative to the platform 75. To bring this about, the book holding lips 105 and 106 (not shown in FIG. 14) are allowed to remain in inoperative withdrawn positions and the table system is permitted to rise to the level shown in FIG. 14. At this point the table flaps 150 are substantially horizontal and upon movement of the book support 76 to the extreme left as viewed and tilting the same sufficiently, the right hand table flap may be readily raised and eventually moved out of operative position to expose the notches 140 in the front and rear walls 136 of the platform 75 to permit dismounting of the book support 76 in the manner previously described.

In using the book holding and manipulating device 74, the same is allowed to rise to a convenient level in response to the action of the spring 95 and a book 131 is placed on the book support 76 and opened to the desired place for copying. The book support 76 is pivoted or tilted about the shaft 142 to place the page to be reproduced in a near horizontal plane with this plane being approximately established and maintained by resting of the associated roller 134 on the track 147. The device 74 is then lowered by foot pressure applied on the treadle 94 and during this lowering the table flaps 150 ride along platform 75 and pivot about their hinge connections 155. The device 74 is lowered to an extent that the page holding lips 105 and 106 may be moved into operative positions relative to the top surface of the open portion of the book to be photographed. Pressure is applied by the knee of the operator against the knee plate 110 and the page holding lips 105 and 106 are moved toward one another into operative positions. Pressure on the treadle 94 is then released and the device 74 automatically moves upwardly into engagement with the lips 105 and 106 at which point the device is constrained against further upward movement and the page to be photographed is automatically located in the focal plane of the reproduction unit associated with the work table.

As particularly shown in FIG. 7, the lips 105 and 106 merely engage top and bottom marginal portions of the exposed page of the book 131 and function to adequately flatten the same and hold the book in proper relation to the camera. The restraining action of the lips against the upward pressure supplied by the spring 95 forces the roller 134 of the nearly horizontal portion of the support 76 against the track 147 which bows downwardly to permit movement of that portion of the book into the focal plane. There is adequate resilient strength in the track 147 to prevent downward tilting of the horizontal portion of the book relative to the focal plane. The spring 95 and track 147 counteract one another to an extent as constrained by the lips 105 and 106. To prevent inadvertent dropping or downward turning of the pages of the book not being photographed, at least one of the lips 105 and 106 has attached to the top surface thereof outwardly and upwardly extending horn-like members 156 which engage the inclined pages sufficiently to prevent interference by the same with photographic reproduction of the page maintained in the horizontal plane. A pair of horns 156 are provided as it will be appreciated that either side of the open book may be photographed.

In photographing opposite pages of the open book, it is necessary merely to release the book by retraction of the lips 105 and 106 and apply downward pressure to the upstanding wing portion of the book support 76 to flip or pivot the same relative to the shaft 142 followed by the application of transverse pressure to move the book support 76 across the platform 75 thereby placing the originally inclined portion of the book support in a horizontal plane and moving the originally horizontally positioned portion into an inclined plane. The track 147 aids in movement of the book support as described with the inclined tracks 152 of the table flaps 150 providing surfaces along which the rollers 134 will move down or up to aid in ease of flipping of the book support. In carrying out this operation it is necessary merely to apply slight pressure to the treadle 94 to slightly lower the entire device 74 and permit the lips 105 and 106 to automatically move out of operative position. The book support 76 is then flipped as described and knee pressure is applied to move the lips 105 and 106 back into operative position with the pressure on the treadle 94 being subsequently released to allow raising of the device 74 into contact with the lips. This quick and efficient operation permits substantially continuous reproduction of a series of pages in the book 131 with the pages being readily turned manually during flipping and transverse movement of the book support 76.

From the foregoing description, it will be apparent that the work table of the present invention is capable of easy and efficient operation in properly positioning and holding a book, especially one which is large and unwieldy, for accurate and fast reproduction of portions thereof. The operator may easily present either page of an open book regardless of its size to the reproduction unit in such a manner that it may be readily copied with the manipulation of the book support being accomplished with a minimum of effort. The book support preferably defines an angle for holding a book open at approximately 130° for accurate reproduction.

For copying relatively flat originals such as maps and the like, the book support 76 is readily removable from the platform 75 as previously described and the platform provides a flat or single plane surface for supporting a map. The table flaps 150 are swung up and outwardly out of contact with the platform and the map is placed on the platform to be supported by the tops of the side and end walls thereof. The platform is lowered below the lips 105 and 106 following which the latter are moved into operative positions to engage and clamp opposite margins of the map to the platform following raising of the platform. This variation in use of the work table of the present invention is illustrative of the versatility of the same.

Obviously, certain modifications and variations of the invention as hereinbefore set forth may be made without departing from the spirit and scope thereof, and therefore only such limitations should be imposed as are indicated in the appended claims.

I claim:

1. A work table for copying machines such as photographic reproduction apparatus, said table including a vertically reciprocable surface by which an article to be copied is supported, first spring means operatively connected with said surface to urge the same toward its uppermost position, laterally acting article engaging means located relative to marginal areas of said surface and an article carried thereby and being movable into and out of article engaging position in which position continued upward movement of said surface is restrained, further spring means operatively connected with said article engaging means to urge the same out of article engaging and surface restraining position, and separate and independently functioning operating means for said surface to overcome said first spring means for downward movement of said surface and for said article engaging means to overcome said further spring means from movement of said engaging means into article engaging and surface restraining position.

2. A work table for copying machines such as photographic reproduction apparatus, said table comprising a platform for supporting an open book or the like, mounting means for said platform whereby it is movable between a raised and lowered position, means for biasing said platform toward its raised position with or without a book thereon, operating means for controllably raising and lowering said platform, a pair of page holders for clamping over the tops and bottoms of the pages of an opened book on the platform, support means for said page holders whereby the same are reciprocable towards and away from each other and the top and bottom edges of a book on said platform, linkage means interconnecting said page holder support means for reciprocably moving the same into and out of page holding position, and operating means for moving said page holders into and out of page holding position.

3. A table of claim 1 wherein said article engaging means include a pair of operatively positioned lips located relative to said surface and an article carried thereby to engage in overlapping relation opposite margins of the article and hold the same against said surface in flattened position.

4. A work table for copying machines such as photographic reproduction apparatus, said table including a vertically reciprocable surface by which an article to be copied is supported, first spring means operatively connected with said surface to urge the same towards its uppermost position, laterally acting article engaging means located relative to marginal areas of said surface and an article carried thereby and being movable into and out of article engaging position in which position continued upward movement of said surface is restrained, further spring means operatively connected with said article engaging means to urge the same out of article engaging and surface restraining position, and separate and independently functioning operating means for said surface to overcome said first spring means for downward movement of said surface and for said article engaging means to overcome said further spring means for movement of said engaging means into article engaging and surface restraining position, said surface being in the form of a plate shaped to substantially correspond to the shape of a substantially opened book and being centrally pivotally supported by means mounted on a platform which support said surface and across which said means are controllably movable, said surface being tiltable in opposite directions by reason of its pivotal support by said means to provide alternate horizontal portions against which the portion of an article carried thereby is flattened by said article engaging means for copying purposes.

5. The table of claim 1 wherein said article engaging means include a pair of oppositely positioned lips located relative to said surface and an article carried thereby to engage in overlapping relation opposite margins of the article and hold the same against said surface in flattened condition, and said surface is in the form of a plate shaped to substantially correspond to the shape of a substantially opened book and is centrally pivotally supported by means mounted on a platform which supports said surface and across which said means are controllably movable, said surface being tiltable in opposite directions by reason of its pivotal supports by said means to provide alternate horizontal portions against which the portion of an article carried thereby is flattened by said lips for copying purposes.

6. The table of claim 1 wherein said surface is defined by a book holding and manipulating device which includes a platform provided with spaced guide tracks having associated therewith roller means carried at each end of a transversely directed rod, spaced gear tracks forming a part of said platform and paralleling said gear tracks, spaced gears carried by said rod and in engagement with said gear tracks, and a book support having a central arcuate portion presenting an upper surface which is concave and being integrally joined with oppositely positioned and outwardly and upwardly directed wing portions, said support being centrally pivotally attached to said rod for tilting movement thereabout to place one or the other of its wing portions in a horizontal position while being movable with said rod across said platform.

7. A book holding and manipulating device for use in a copying machine, said device including a platform provided with spaced guide tracks having engaged therewith roller means carried at each end of a transversely directed rod, spaced gear tracks forming a part of said platform and paralleling said guide tracks, spaced gears carried by said rod and in engagement with said gear tracks, and a book support having a central arcuate portion presenting an upper surface which is concave and being integrally joined with oppositely positioned and outwardly and upwardly directed wing portions, said support being centrally pivotally attached to said rod for tilting movement thereabout to place one or the other of its wing portions in a horizontal position while being movable with said rod across said platform.

8. A book holding and manipulating device for use in a copying machine, said device including a platform provided with spaced guide tracks having engaged therewith roller means carried at each end of a transversely directed rod, spaced gear tracks forming a part of said platform and paralleling said guide tracks, spaced gears carried by said rod and in engagement with said gear tracks, a book support having a central arcuate portion presenting an upper surface which is concave and being integrally joined with oppositely positioned and outwardly and upwardly directed wing portions, said support being centrally pivotally attached to said rod for tilting movement thereabout to place one or the other of its wing portions in a horizontal position while being movable with said rod across said platform, a roller track extending across said platform intermediate said guide tracks, and support rollers carried on the undersurface of each wing portion for engagement with said roller track upon tilting of the same into a horizontal position.

9. A book holding and manipulating device for use in a copying machine, said device including a platform having oppositely positioned upstanding wall portions each of which defines a guide track having received therein roller means carried by an end of a transversely directed rod, a gear track associated with each of said guide tracks and being in engagement with gears carried by said rod, a book support having a central arcuate portion presenting an upper surface which is concave and being integrally joined with oppositely positioned and outwardly and upwardly directed wing portions, said support being centrally pivotally attached to said rod for tilting movement thereabout to place one or the other of its wing portions in a horizontal position while being movable with said rod across said platform, a resilient track extending across said platform intermediate said wall portion, and support rollers carried on the under surface of each wing portion for engagement with said resilient track upon tilting of the same into a horizontal position.

10. A work table for copying machines such as photographic reproduction apparatus, said table including a frame which mounts therein a vertically reciprocable platform which is upwardly movable into association with the top of said frame, first spring means operatively associated with said platform to urge the same toward its uppermost position, said platform carrying a laterally movable book support formed from angularly upwardly and outwardly directed wing portions, said book support being pivotally mounted on said platform for tilting relative thereto to place one or the other of its wing portions in a horizontal plane, laterally acting book engaging means located relative to marginal areas of said book support and a book carried thereby and being movable into and out of book engaging position in which position continued upward movement of said platform is restrained, further spring means operatively connected with said book engaging means, and separate and independently functioning operating means for said platform to overcome said first spring means for downward movement of said platform and for said book engaging means to overcome said further spring means for movement of said engaging means into book engaging and platform restraining position.

11. The table of claim 10 wherein said book engaging means include a pair of oppositely positioned lips located relative to said book support and a book carried thereby to engage in overlapping relation opposite margins of the book and hold the same against said book support in flattened condition.

12. The table of claim 10 wherein said platform is provided with oppositely positioned upstanding wall portions each of which defines a guide track having received therein roller means carried by an end of a transversely directed rod, a gear track associated with each of said guide tracks and being in engagement with gears carried by said rod, and wherein said book support is provided with a central arcuate portion presenting an upper surface which is concave and which is designed for receiving the binding or hinged portion of a book therein, said central arcuate portion being integrally joined with and intermediate said wing portions, said book support being further centrally pivotally attached to said rod for tilting movement thereabout to place one or the other of its wing portions in a horizontal position while being movable with said rod across said platform, and wherein a resilient track extends across said platform intermediate said wall portions, and support rollers are carried on the under surface of each wing portion for engagement with said resilient track upon tilting of the same into a horizontal position.

13. The table of claim 11 wherein said platform is provided with oppositely positioned upstanding wall portions each of which defines a guide track having received therein roller means carried by an end of a transversely directed rod, a gear track associated with each of said guide tracks and being in engagement with gears carried by said rod, and wherein said book support is provided with a central arcuate portion presenting an upper surface which is concave and which is designed for receiving the binding or hinged portion of a book therein, said central arcuate portion being integrally joined with and intermediate said wing portions, said book support being further centrally pivotally attached to said rod for tilting movement thereabout to place one or the other of its wing portions in a horizontal position while being movable with said rod across said platform, and wherein a resilient track extends across said platform intermediate said wall portions, and support rollers are carried on the under surface of each wing portion for engagement with said resilient track upon tilting of the same into a horizontal position.

14. A work table for copying machines such as photographic reproduction apparatus, said table including a frame which mounts therein a vertically reciprocable platform which is upwardly movable in association with the top of said frame, first spring means operatively connected with said platform to urge the same towards its uppermost position, said platform carrying a laterally movable book support formed from angularly upwardly and outwardly directed wing portions, said book support being pivotally mounted on said platform for tilting relative thereto to place one or the other of its wing portions in a horizontal plane, a resilient track extending across said platform in the direction of lateral movement of said book support, a roller carried on the under surface of each wing portion for engagement with said resilient track upon tilting of said book support, laterally acting book engaging means located relative to marginal areas of said book support and a book carried thereby and being movable into and out of book engaging position in which position continued upward movement of said platform is restrained, said resilient track being arranged to bow downwardly centrally thereof in response to the restraining action of said book engaging means to allow accurate positioning of a wing portion in a horizontal plane and flattening of a book portion carried thereby for copying purposes, further spring means operatively connected with said book engaging means to urge the same out of book engaging and platform restraining position, and separate and independently functioning operating means for said platform to overcome said first spring means for downward movement of said platform and for said book engaging means to overcome said further spring means for inward movement of said engaging means into book engaging and platform restraining position.

15. The table of claim 14 wherein said frame has hingedly attached thereto at the top thereof a pair of oppositely positioned cover flaps the innermost free ends of which are arranged to rest on said platform and slide therealong during vertical movement of said platform, said flaps being swingable upwardly and outwardly of said frame to expose means forming a part of said platform by use of which said book support can be dismounted from said platform, said flaps in their operative positions covering said means and preventing dismounting of said book support while presenting inclined planes to said rollers for use in tilting said book support.

16. The table of claim 14 wherein said frame has hingedly attached thereto at the top thereof a pair of oppositely positioned cover flaps the innermost free ends of which are arranged to rest on said platform and to slide therealong during vertical movement of said platform, said flaps being swingable upwardly and outwardly of said frame to expose means forming a part of said platform by use of which said book support can be dismounted from said platform, said flaps in their operative positions covering said means and preventing dismounting of said book support while presenting inclined planes to said rollers for use in tilting said book support, said flaps each including a resilient strip therein which is aligned with a roller to serve as an inclined track therefor.

17. The table of claim 14 wherein said book engaging means are in the form of lips which are arranged to overlap and engage top and bottom marginal portions of that portion of a book to one side of the bound hinged area thereof which is supported by a wing portion tilted into a horizontal plane, one of said lips carrying a pair of upwardly and oppositely outwardly directed horn-like means arranged to engage the side of a book opposite the bound hinged area thereon to prevent movement of the pages thereof.

18. In a machine of the class described, apparatus for holding a book or the like open at a desired page comprising, a platform for supporting an open book or the like, mounting means for said platform whereby it is movable between a raised and lowered position, means for biasing said platform toward its raised position with or without a book thereon, operating means for controllably raising and lowering said platform, a pair of page holders for clamping over the tops and bottoms of the pages of an opened book on the platform, support means for said page holders whereby the same are reciprocable toward and away from each other and the top and bottom edges of a book on said platform, linkage means interconnecting said page holder support means for reciprocably moving the same into and out of page-holding position, and operating means for moving said page holders into and out of page-holding position.

19. A device for use in supporting an open book or the like, said device comprising a supporting generally V-shaped surface connected with vertical positioning means operative to raise and lower said surface, quick acting clamp means selectively operative with each wing portion of said surface to secure the same in a fixed horizontal plane, and means mounting said surface for lateral tilting.

20. A device for use in supporting an open book or the like, said device comprising a supporting generally V-shaped surface connected with vertical positioning means operative to raise and lower said surface, quick acting clamp means selectively operative with each wing portion of said surface to secure the same in a fixed horizontal plane, and means mounting said surface for lateral tilting, said last named means including members permitting lateral sliding of said surface during tilting thereof to selectively place each wing portion of said surface in a common plane.

21. The device of claim 20 wherein said quick acting clamp means includes means urging said surface vertically upwardly and laterally acting surface position control means operative with said surface to restrain said first named means.

22. A device for use in supporting an open book or the like, said device comprising an open book supporting generally V-shaped surface connected with vertical positioning means operative to raise and lower said surface, quick acting clamp means operative with a wing portion of said surface and an open book portion thereon to engage said book portion along top and bottom margins thereof to secure the same and said surface in fixed horizontal planes, means mounting said surface for lateral tilting to place opposite book portions and wing portions of said surface in fixed horizontal planes in cooperation with said quick acting clamp means, and resilient means operative with each wing portion of said surface when the same is placed in a horizontal plane to urge and hold the top surface of the book portion carried thereby uniformly against said clamp means and in a uniform horizontal plane.

23. The device of claim 22 wherein said quick acting clamp means includes means urging said surface vertically upwardly and laterally acting surface position control means operative with said surface to restrain said first named means.

References Cited in the file of this patent

UNITED STATES PATENTS

| 543,081 | Clark | July 23, 1895 |
| 576,824 | Reynolds | Feb. 9, 1897 |
| 793,978 | Beidler | July 4, 1905 |
| 898,692 | Shepard | Sept. 15, 1908 |
| 1,000,605 | Jones | Aug. 15, 1911 |
| 1,070,848 | Schwab | Aug. 19, 1913 |
| 2,065,011 | McDowell | Dec. 22, 1936 |
| 2,161,352 | Hopkins | June 6, 1939 |
| 2,166,419 | O'Neill | July 18, 1939 |
| 2,418,670 | Schubert et al. | Apr. 8, 1947 |

FOREIGN PATENTS

| 62,139 | Denmark | Apr. 11, 1944 |
| 588,158 | Great Britain | May 15, 1947 |
| 125,150 | Sweden | June 7, 1949 |
| 815,897 | Germany | Mar. 20, 1952 |